United States Patent [19]
Bahder et al.

[11] 4,080,131
[45] Mar. 21, 1978

[54] CURING SYSTEM FOR HIGH VOLTAGE CROSS LINKED CABLES

[75] Inventors: George Bahder; Carlos Katz, both of Edison; Louis A. Bopp, Fair Haven, all of N.J.

[73] Assignee: General Cable Corporation, Boonton, N.J.

[21] Appl. No.: 791,188

[22] Filed: Apr. 27, 1977

[51] Int. Cl.² .......................... B29F 3/00; B29D 3/02
[52] U.S. Cl. .................................. 425/113; 425/174.2; 425/174.6; 425/404; 425/122; 425/445
[58] Field of Search .............. 425/113, 122, 71, 174.2, 425/174.6, 404, 445, 446

[56] References Cited
U.S. PATENT DOCUMENTS

| | | | |
|---|---|---|---|
| 3,045,281 | 7/1962 | Skobel | 425/174.6 X |
| 3,645,656 | 2/1972 | Stauffer et al. | 425/113 X |
| 3,650,647 | 3/1972 | Jacobs et al. | 425/174.2 X |
| 3,737,490 | 6/1973 | Nicholson | 425/113 X |
| 3,900,539 | 8/1975 | Puleo | 425/174.6 X |
| 3,909,177 | 9/1975 | Takaoka et al. | 425/113 X |
| 3,988,092 | 10/1976 | Bloxham et al. | 425/445 X |

Primary Examiner—J. Howard Flint, Jr.
Attorney, Agent, or Firm—Roy C. Hopgood; John M. Calimafde; Charles W. Neill

[57] ABSTRACT

This invention makes extruded, vulcanized, high voltage cables insulated with thermosetting compounds at much higher rates of production and with superior insulation of reduced thickness and with reduced cavities or voids in the insulation. As the cable comes from an extruder, it passes into a curing chamber with a heat booster that quickly raises the insulation to a temperature at which it is cured much more quickly than with steam heating of the prior art. A high temperature liquid in contact with the insulation maintains the high temperature; and because of the greater curing heat, the cable can travel through the curing chamber at a faster rate and into a cooling tube where it contacts with a cooling liquid under high pressure. The insulation compound is treated to reduce the size of cavities; and the high pressure maintained by the curing and cooling mediums prevent expansion of cavities before the insulation is set.

29 Claims, 12 Drawing Figures

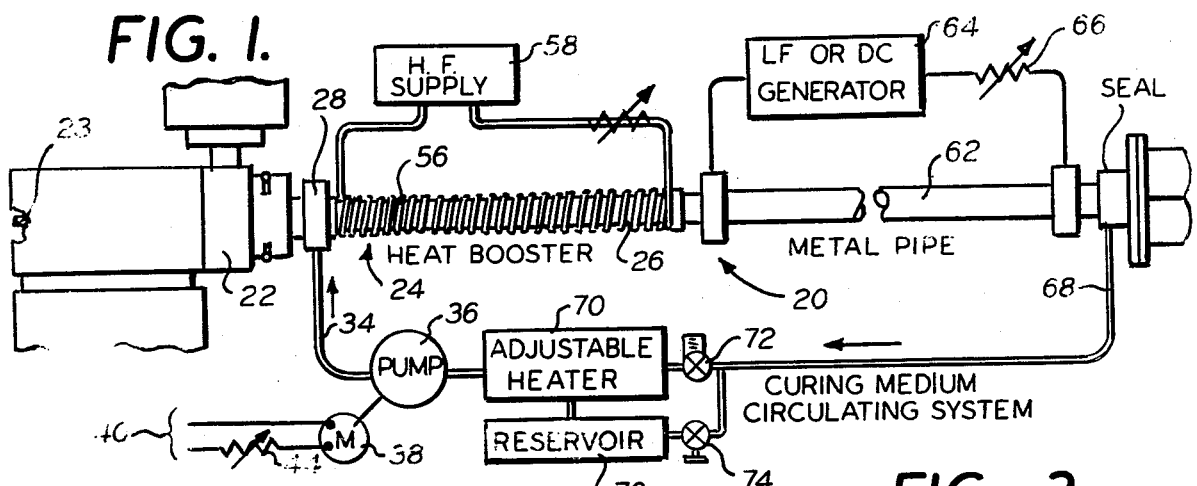
FIG. 1.
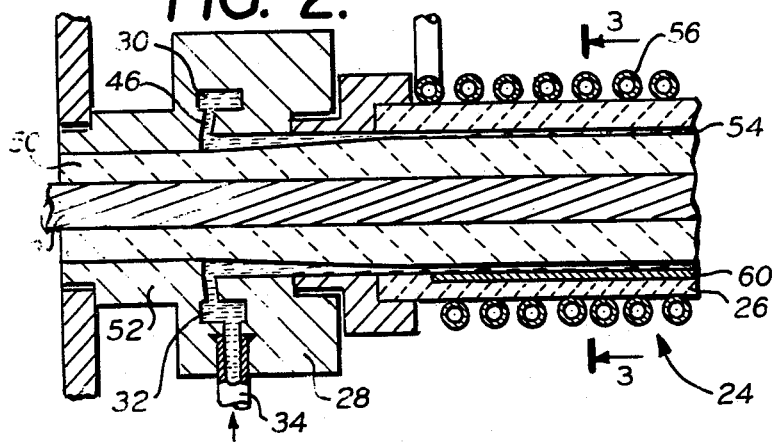
FIG. 2.
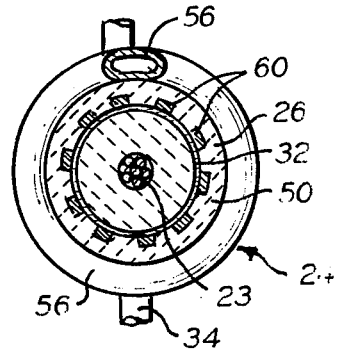
FIG. 3.
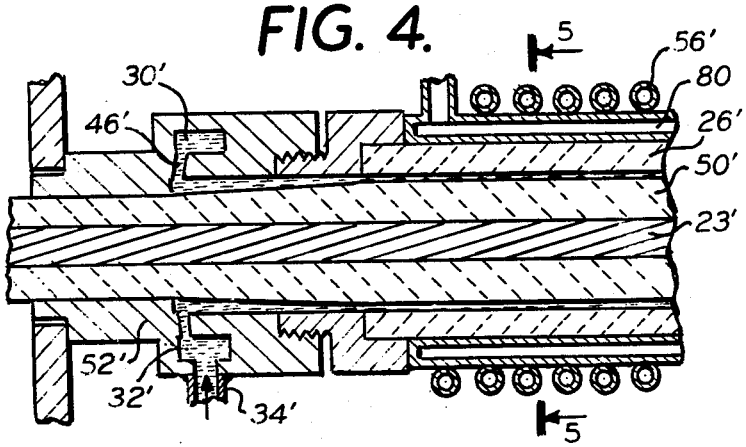
FIG. 4.
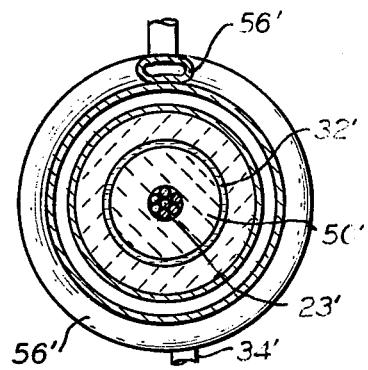
FIG. 5.
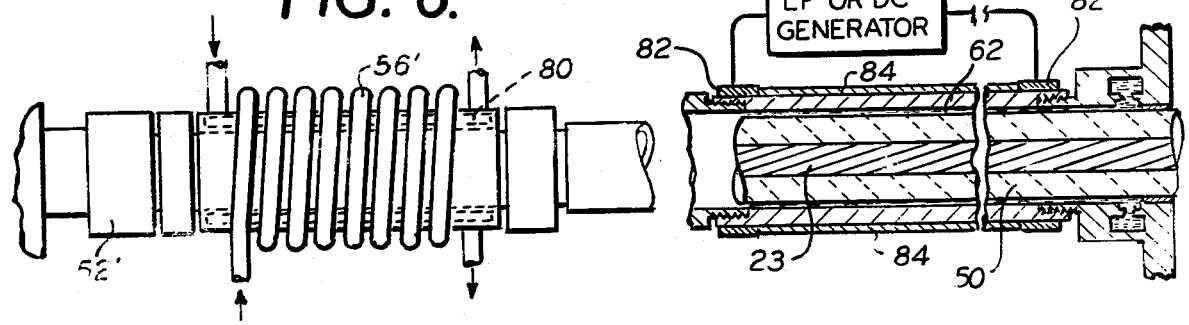
FIG. 6.
FIG. 7.

CURING SYSTEM FOR HIGH VOLTAGE CROSS LINKED CABLES

SPECIAL NOTICE

This invention resulted from work done under Contract No. E(49-18)-1827 with the Department of Interior.

BACKGROUND AND SUMMARY OF THE INVENTION

The most widely accepted technique of manufacturing extruded vulcanized type cables, at present, is to feed the conductor through a series of extruder heads and apply concentrically the semiconducting, and insulating compounds. The cables are subsequently cured in a saturated steam environment followed by cooling under pressure. Protective coverings are applied in subsequent operations.

In the steam curing process, the insulated conductor is moved through the vulcanizer and exposed to pressurized (typically 250 psi) saturated steam followed by cooling under pressurized water (typically 250 psi). The thermosetting compound contains curing agents which are activated at the high curing temperatures. The speed of reaction depending on the exposure temperature (for steam, approximately 210° C).

The steam curing process is being utilized in catenary and in vertical installations. The vertical configuration is advantageous from the processing point of view, because it is easier to achieve cable core concentricity. However, because of the very high cost of building towers for this type of curing system, the length of the curing pipes has to be limited and hence, low processing speeds have to be utilized. Long length curing pipes are desirable because polyethylene and ethylene propylene rubber insulations are characterized by having high thermal resistances and thus, heavily insulated cables, as used for high voltage operation, take a long time to cure. The catenary installation uses longer vulcanizing pipes, typically 300 to 600 ft. long. Even at these lengths, commercial 69 and 138 kV cables, having 650 and 800 mils of XLPE insulation, are manufactured at a typical rate of about 2 to 5 ft/min.

An additional shortcoming of the steam curing method of manufacture is the fact that during the time it takes for the crosslinking reaction to take place, the outside of the insulation is exposed to high pressure steam. It has been widely demonstrated that steam penetrates into the insulation and creates microscopic cavities, imposing limits on the dielectric strength of the cured insulation.

A further shortcoming of the catenary installations is the fact that the touchdown of the cable occurs in the pipe when the insulating compound is still soft and deformable. Because of this, certain degree of out-of-roundness becomes inherent with this method of production. The deformation is aggravated by the large size pipes used and is accentuated for the higher voltage cables, which generally have greater weights. Hence, the catenary installation can be utilized for manufacture of cables having a limited weight only.

Large lengths of extruded insulated cables made by the steam curing process have been in operation for many years. Their ability to withstand the high operational voltages results from the heavy insulation walls used on such cables. Reduction in the size of microcavities present in the insulation and the elimination of significant deformation of the cable insulation, in accordance with this invention, permits the use of thinner insulation walls and makes possible the manufacture of cables rated for higher voltages without proportionate increase in the thickness of the insulation.

In order to improve the characteristics of the dielectric and the manufacturing process of extruded type cables, a number of different systems have been proposed in the past. The most significant ones relate to curing the cable in a pressurized inert hot gas environment using similar curing tubes to those used in the steam curing process (as described in IEEE Power Apparatus and Systems 94, March/April 1975, and in the IEEE Conference Record, 1974, Underground Transmission Conference, Dallas, Apr. 1974. Another expedient has been the extruding of the insulation on the conductor through a long sizing passage in which the insulation is simultaneously cured (U.S. Pat. No. 3,054,152, Sept. 18, 1962).

This last method for curing thermosetting compounds was first disclosed in U.S. Pat. No. 2,742,669 Apr. 24, 1956). Some further refinements of the method are disclosed in U.S. Pat. No. 3,868,436 (Feb. 25, 1975); and in U.S. Pat. No. 3,928,525 (Dec. 23, 1975).

The long land die curing system in the above-described references requires a very precise control of the compound output from the extruder. If the compound output is smaller than the output required to fully fill the long land die, then only a portion of the cable core will be in contact with the die. The other portion of the surface will not follow the circular configuration of the die and will be rough. This roughness will contribute to a lower breakdown of the insulation. In the case of excessive output of compound from the heat, an excessively high pressure will build up in the head and in the long land die. The excessive pressure will prevent the flow of the lubricant and can result in a push-back of the compound through the tip of the insulating head. This condition also leads to lower dielectric breakdown of the cable insulation and in extreme cases will force an interruption of the cable manufacturing process. Precise control of compound output from the insulating head, as required by the long land die curing system is difficult and in many cases not practical.

A further shortcoming of this method of curing is the required use of long land dies having lengths of 50 to 100 ft., for achieving processing speeds comparable to those used in catenary installations.

The novel curing system of the present invention can be used in a process that extrudes three layers, as in U.S. Pat. No. 3,446,838; or four or five layers, as disclosed in U.S. Pat. No. 3,885,058. With the present invention, using a short land die, there is a composite mini-curing pipe larger in diameter than the short land die and adjacent to the discharge end of the short land die. The mini-curing pipe consists of two sections: the first one made of insulating material and incorporating a heat booster, and the second one consisting of a heated metal pipe with a length selected in accordance with the desired processing speed. Both sections of the pipe have the same inside diameter. A liquid curing medium is introduced into the mini-pipe close to the end of the short land die and is forced out at the far end of the mini-curing pipe. The heating of the cable core is accomplished in various ways which will be explained in connection with the drawing. The heat booster preferably comprises a coil connected to a high-frequency generator which sets up a high-frequency field for generating heat in the metal conductor which contacts with the inside surface of the insulation system and also in strips of metal which heat the outside of the insulation across a liquid medium.

The mini-curing pipe contains a liquid curing medium which contacts with the outside of the insulation system and which is at a temperature much higher than the temperature of the steam previously used for curing cable insulation. The liquid curing medium should be of high molecular weight, at least 800, to minimize its penetration into the cable core. The liquid is circulated by means of a pressurizing circulating pump.

This novel curing process has the following advantages:

a) It allows for the curing of the cable core at pressures much higher than pressures utilized in other known methods, and in this way significantly minimizing the size of cavities in the insulating system.

b) It allows for the maintenance of high processing speed using curing pipes with lengths much shorter than that of other known curing systems.

c) It assures minimum out-of-roundness, because the diameter of the mini-curing pipe is not substantially larger than the diameter of the cable core.

d) It does not require tight tolerances in the extruder output of compound, because from this point of view, tolerances between the diameter of the cable core and of the curing pipe are substantial.

e) It provides an insulation system with a minimum penetration of liquid into the core, because of the use of high molecular weight liquid curing mediums.

f) It provides a compacted structure of the core, with smooth surface, which is obtained in a short land die without use of lubricants.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic view showing the relation of the mini-curing pipe to the extruder and subsequent cooling pipe; and showing also heating and circulating means;

FIG. 2 is a greatly enlarged, fragmentary sectional view of the left-hand end of the heat booster shown in FIG. 1;

FIG. 3 is a sectional view taken on the line 3—3 of FIG. 2;

FIG. 4 is a view similar to FIG. 3 but showing a modified construction;

FIG. 5 is a sectional view taken on the line 5—5 of FIG. 4;

FIG. 6 is an elevation, on a reduced scale, of the modified construction shown in FIG. 5;

FIG. 7 is an enlarged sectional view, partly broken away, showing the metal pipe or curing chamber of FIG. 1;

DESCRIPTION OF PREFERRED EMBODIMENT

Figure 8:
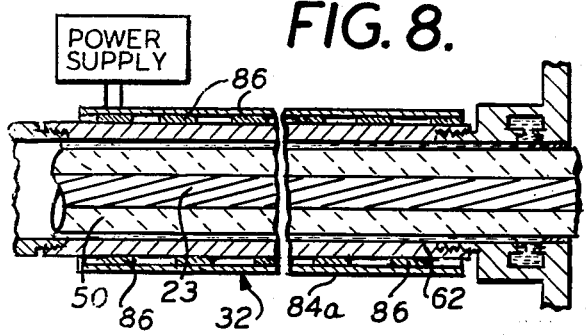
FIGS. 8 and 9 are views similar to FIG. 7 but showing two different modified constructions for heating the metallic pipe of the mini-curing pipe.

FIG. 1 shows a mini-curing pipe system 20 connected to the discharge end of an extruder 22 through which a cable core 23 passes and in which insulation is extruded over the cable core. The insulated cable comes from the extruder 22 at a temperature lower than that required for curing the insulation, since it is not desirable to have the insulation cured in the extruder.

The first section of the mini-curing pipe system is a heat booster 24 which consists of pipe 26 made of insulating material and strong enough to resist bursting as a result of the high-pressure liquid contained within the pipe 26. This pipe 26 is preferably made of strong ceramic material (FIG. 2).

A collar 28 is connected with the pipe 26. This collar 28 contains an annular chamber 30 to which hot curing liquid 32 is supplied through a pipe 34 which is connected with the discharge outlet of a pump 36. Pump 36 is operated by a motor 38, shown in FIG. 1 as an electric motor, and with electric power connections 40, including a speed control 44 which is adjustable.

The hot curing liquid 32 (FIG. 2) passes from the annular chamber 30 through openings 46 to the interior of the collar 28 which provides a chamber of the same inside diameter as the pipe 26. Insulation 50, surrounding the cable conductor 23, comes from the extruder die 52 into the open center portion of the collar 28 where the insulation 50 expands to a somewhat larger outside diameter which is less than the inside diameter of the pipe 26. This leaves a clearance between the outside of the insulation 50 and the inside surface of the pipe 26. This clearance is indicated in FIG. 2 by the reference character 54.

The clearance 54 must be sufficient so that as the cable insulation 50 is heated in the heat booster 24, the expansion of the cable at maximum temperature will never be enough to make the outside diameter of the cable equal the inside diameter of the pipe 26. There must always be sufficient clearance 54 for the circulation of the liquid curing medium 32 along the length of the pipe 26 around the outside of the cable insulation 50.

In order to raise the temperature of the insulation to a degree that will cause rapid curing, the insulation is heated in the heat booster 24 from both sides. This is accomplished by having an induction coil 56 wrapped around the outside of the pipe 26. A source of high-frequency electric power is connected with the opposite ends of the coil 56, as shown at 58 in FIG. 1. The field set up by the coil 56 does not heat the ceramic pipe 26 but does strongly heat the conductor 23. The flow of heat from the hot conductor 23 to the insulation 50 heats the insulation from the inside.

Referring to FIG. 3, there are metal strips 60 embedded in the inside surface of the ceramic pipe 26. These metal strips do not show in the top of FIG. 2, because they are not on the plane of section. The strips 60 are also highly heated by the high-frequency field of the induction coil 56, and these strips 60 are in contact with the liquid curing medium 32 through which the hot strips 60 transfer heat to the outside of the insulation 50.

By way of example, the high-frequency electrical supply element 58 (FIG. 1) supplies an electromagnetic field of from 200 to 400 kHz. There are spaces between the metal strips 60 (FIG. 3) so as to permit the high-frequency field to heat the conductor 23. If the strips 60 covered the entire inside surface of the pipe 26, they would constitute a shield which would prevent satisfactory heating of the conductor 23 by the electromagnetic field set up in the coil 56 by the high-frequency electrical supply. Preferably, the spacing of the strips 60 is selected so as to cause the induction coil 56 to supply substantially equal amounts of heat to the inside and outside surfaces of the insulation 50 from the conductor 23 and strips 60.

As the cable travels along the first section of the mini-curing system 24, the insulation 50 and the liquid curing medium 32 become more highly heated, and they pass from the pipe 26 into a metallic curing pipe 62. The temperature of the liquid curing medium and the insulation, as they pass through the metallic pipe 62, is preferably much higher than saturated steam, and this greatly reduces the time required for curing the insulation. For example, in the use of dicumyl peroxide as the crosslinking agent for crosslinked low density polyethylene insulation, the curing time at 170° C is in excess of 20 minutes, while at 205° C, this time reduces to only about 1.5 minutes.

In the novel curing process of this invention, temperature limitations are dictated only by the maximum temperature the compounds can withstand, without degradation of their components, rather than by the maximum temperature one can apply to the heating medium, which, in the case of super-heated steam, is about 210° C. In the case of cross-linked polyethylene and ethylene propylene rubber insulated cables, cured in the mini-pipe system of this invention, the maximum temperature used is about 315° C. There are a number of high temperature resistant oils which can be used for this invention such as dimethyl silicone and Ucon 50 HB-280-X and Ucon-LB-300-X, the latter two being manufactured by the Union Carbide Company of New York City. The liquids selected for the liquid curing medium of this invention must have special characteristics such as good thermal transfer, high operational temperature, good compatibility with crosslinked polyethylene and ethylene propylene rubber compounds, and, most significantly, high molecular weight of at least 800 to minimize or avoid migration of the liquid into the extruded compounds of the insulation or insulation shield or emission shield. Anti-oxidants may be incorporated into the heat transfer medium.

In order to maintain the temperature in the metallic curing pipe 62 (FIG. 1), a low-frequency or direct current generator 64 may be used to pass a heavy electric current through the metal pipe 62. The electrical resistance heating of the metal pipe transfers heat to the liquid curing medium within the pipe 62, and the amount of heat thus generated is controlled by adjustable current regulating means 66, shown diagrammatically in FIG. 1 and which will usually be incorporated into the generator 64.

The liquid curing medium is discharged from the downstream end of the metallic pipe 62 through tubing 68 which carries the curing medium back through a heater 70 to the circulating pump 36.

The pump 36 is constructed to supply the curing medium through the pipe or tubing 34 to the mini-curing pipe 20 at the desired pressure, which is preferably a minimum of 500 pounds per square inch. In order to prevent the escape of this pressure at the downstream end of the mini-curing pipe, the tubing 68 has a pressure regulator 72 which is adjusted to maintain the mini-curing pipe pressure, and there is a valve 74 for controlling flow from the pressure regulator 72 to a reservoir 76 which the pump 36 can withdraw liquid as needed.

FIG. 4 is a view similar to FIG. 2 but showing a modified construction. Parts in FIG. 4 which correspond to those in FIG. 2 are indicated by the same reference character with a prime appended. The structure of FIG. 4 differs from that of FIG. 2, in that the metal strips embedded in the pipe 26 of FIg. 2, as shown in FIG. 3, are omitted, and a heating jacket 80 surrounds the outside of the pipe 26' and maintains the pipe 26' highly heated so that it transfers heat to the insulation 50'. The induction coil 56' is wrapped around the outside of the heating jacket 80.

FIG. 5 is a sectional view taken on the line 5—5 of FIG. 4; and FIG. 6 is an elevation of the structure shown in section in FIG. 4.

FIG. 7 is a sectional view of the metallic pipe 62 with the generator 64 connected by a circuit, including collars 82 in direct contact with the metal pipe 62, which is used as a resistance element in the circuit of the generator 64. Thermal insulation 84 surrounds the outside of the pipe 62 to prevent unnecessary loss of heat.

FIG. 8 shows a modification of the construction shown in FIG. 7 with the pipe 62 surrounded by a helical resistance element 86, which is used to heat the metal pipe 62 instead of passing the current directly through the metal pipe.

Figure 9:
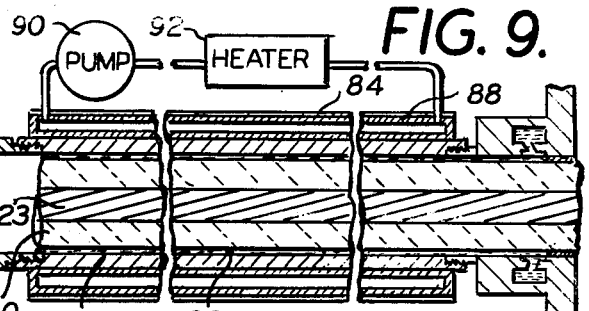

FIG. 9 shows the pipe 62 heated by a jacket 88 through which liquid is circulated by a pump 90 in series with a heater 92 for maintaining the temperature of the liquid which circulates in the jacket 88.

Thermal insulation 84 covers the outside of the jacket 88.

There is similar thermal insulation 84a on the construction shown in FIG. 8, and both of the constructions shown in FIGS. 7 and 8 have electrical insulation for preventing anyone in the vicinity of the pipe 62 from receiving an electric shock from the pipe 62 in FIG. 7 or from the resistance heater 86 in FIG. 8.

Figure 10:
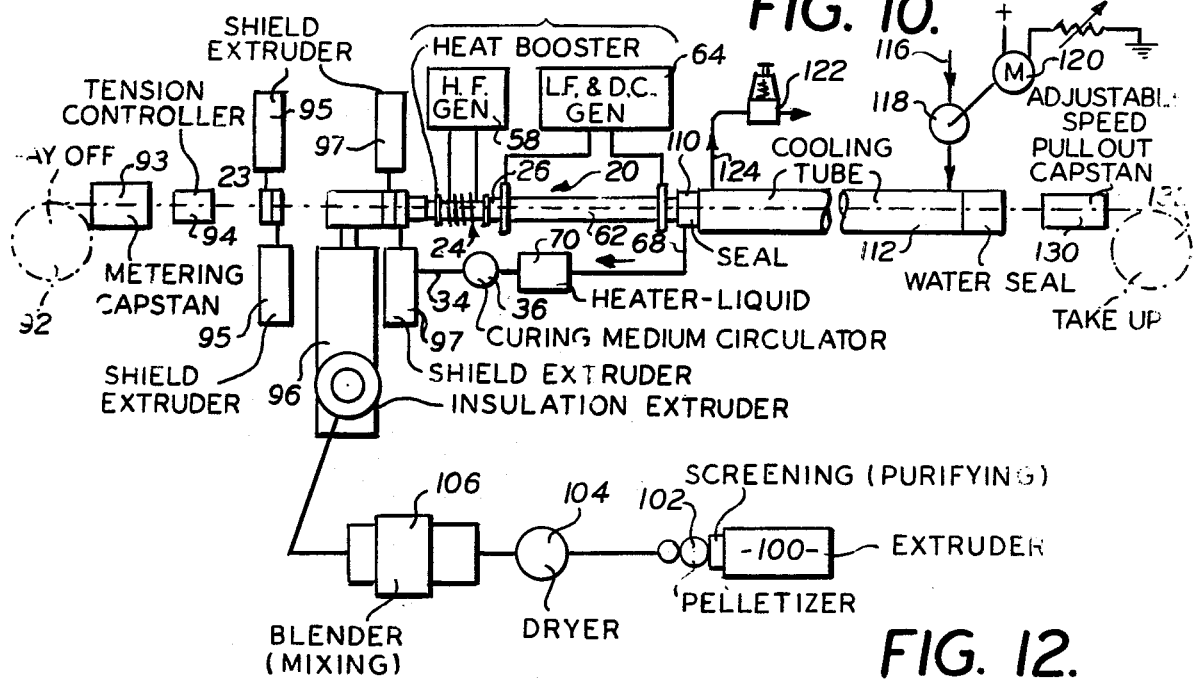
FIG. 10 is a diagrammatic view showing the apparatus of FIG. 1 associated with other structure of the cable-making apparatus, including the conductor pay off; diagrammatic extrusion apparatus; special insulation supply means for reducing the size of cavities or voids in the insulation; a cooling tube beyond the mini-curing pipe system; apparatus for circulating cooling fluid under high pressure; a pullout capstan and cable take-up.

FIG. 10 shows the mini-curing pipe system 20 connected with auxiliary equipment used for making a cable. The cable conductor 23 pays off from a spool 92 through a metering capstan 93 and tension controller 94. An extruder 95 applies the conductor shield which is a semiconducting layer. An extruder 96 supplies the insulation over the semiconducting shield, and a third extruder 97 applies a semiconducting layer over the insulation. There can be additional extruders if other layers are to be used on the cable, such as an emission layer.

The mini-curing pipe system is preferably used with apparatus for reducing the size of cavities or voids in the insulation.

In FIG. 10, the standard extruder line is complemented by incorporating an extruder 100 for the resin as received from suppliers. This resin is purified by removing all harmful contaminants of sizes larger than about 1.5 mils, using fine mesh screens. The insulation material is again pelletized in pelletizer 102 and dried in a dryer 104 before being mixed in a blender 106. The material is mixed with purified cross-linking and antioxidant agents using a blending process as described in U.S. Pat. No. 3,455,752. The process is performed in a dust-free, enclosed system.

There is a seal 110 at the end of the mini-curing pipe 20 for preventing the escape of curing liquid from the mini-curing pipe. When the insulated cable passes through the seal 110, it enters a cooling tube 112 in which it is exposed to high pressure cooling water surrounding the entire cable.

The preferred form of seal 110, at the exit end of the mini-curing system 20, has the inside diameter of the pipe 62 approach the outside diameter of the cable, and in so doing to provide an effective seal for the curing liquid medium which is forced by this restriction to leave the curing pipe 62 by way of a circumferential liquid collecting channel located just before the constriction and connected at various points with another collector situated at the outside of the curing pipe and from which the liquid is piped through the tubing back through the heater 70 and pump 36 to the upstream end of the mini-curing system.

Cooling water is supplied to the cooling tube 112 from a supply line 116 through which the water is forced by a pump 118 driven by a variable speed motor 120. The pump 118 supplies water to the tube 112 at the desired high pressure and a pressure control valve 122 is connected to an exhaust line 124 at the upstream end of the cooling tube 112.

The cable is advanced through the apparatus shown in FIG. 10 by a pull-out capstan 130 and the finished cable is wrapped on a take-up spool 132. Seals are provided at both ends of the cooling tube 112 in order to prevent escape of water and drop in pressure of the cooling water.

Figure 11:
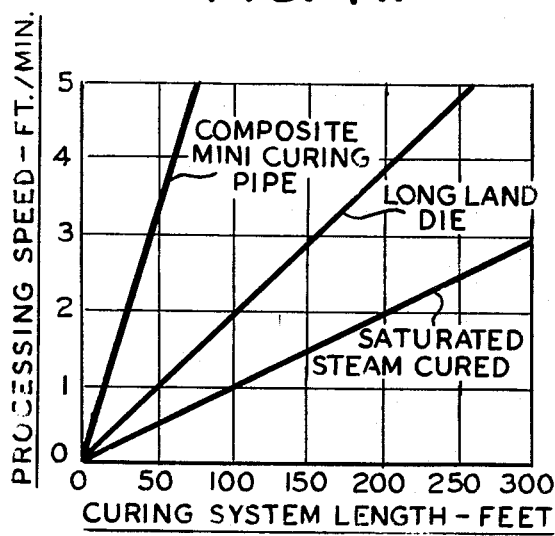
FIG. 11 is a graph showing comparisons of processing speed with prior art curing systems as compared with the curing system of this invention.

Temperature, pressure, liquid flow, and other monitoring equipment are considered as integral part of the composite-mini-curing pipe system. The m.c.p. system can be used with vertical, horizontal, and slanted extrusion line installations. For any particular size cable, the overall length of the m.c.p. system will vary somewhat, depending on the type of heat booster, pipe heating medium, liquid curing medium temperature, heat distribution, and processing speed selected; but in any case the total length of the curing pipe will be significantly shorter than that of pipes used in other curing methods. For example, in the case of XLPE insulated cables having a 2000 kcmil copper conductor, 800 mils of insulation and 40 mils of semiconducting shields and assuming a 182° C curing temperature, it would take 100 minutes to fully cure the insulation in a catenary installation with saturated steam environment (maximum temperature 208° C) versus 52 minutes in a long land die installation where the outside temperature is maintained constantly at 315° C and versus only 14 minutes in the mini-curing pipe system where 315° C are available from the conductor (in the heat booster section) and 315° C are supplied constantly from the outside of the insulation system. FIG. 11 shows the significant advantage of the m.c.p. system from the point of length of the curing installation, when the 3 systems are compared for particular processing speeds.

Figure 12:
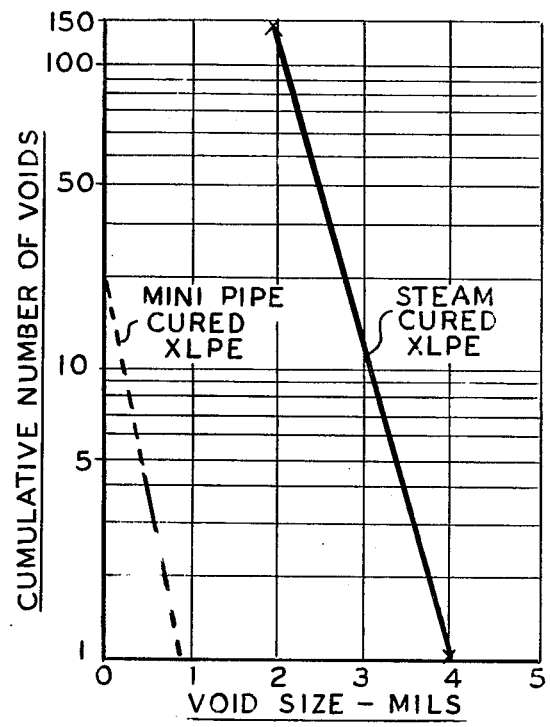
FIG. 12 is a graph showing the comparative number of voids in the insulation cured by the prior art steam curing and cured by the mini-curing pipe system of this invention.

To produce good quality cable, the use of the m.c.p. system is linked with the use of a pressurized cooling system, in which the temperature of the cable is allowed to gradually drop to environment temperature while maintaining the cable under elevated pressures. This pressure, however, is lower than the pressure exercised on the liquid curing medium. The insulation of cables made by the m.c.p. system process are characterized by having very small size and number of voids. FIG. 12 shows the results of typical microscopic examination made on slices of insulation removed from a cable made by the steam curing process and that of the cable made by the mini-curing pipe process.

The preferred embodiment of the invention has been illustrated and described, but changes and modification can be made and some features can be used in different combinations without departing from the invention as defined in the claims.

We claim:

1. A curing system for extruded insulation that surrounds a conductor of a high-voltage electric cable including in combination a heat booster into which an insulated cable passes as it comes from an extrusion die, the heat booster including means for heating the insulation from the inside by highly heating the conductor with a high frequency dielectric field, the heat booster including other means for heating the insulation from the outside by bringing hot liquid into contact with the outside surface of the insulation, a curing tube into which the cable passes from the heat booster and in which the insulation is cured.

2. The curing system described in claim 1 characterized by both the heat booster and the curing tube enclosing chambers through which the cable passes successively with clearance between the outside surface of the cable and the inside surfaces of the chambers, the means for heating the insulation from the outside being a supply of hot liquid, a pump for circulating the hot liquid through said clearance in the curing tube, and a heater for maintaining the liquid at a temperature high enough for curing the insulation.

3. The curing system described in claim 2 characterized by passages for the liquid that circulates through the clearance between the cable and the inside wall of the heat booster and the curing tube, said passages including one that connects with the upstream end of the heat booster and one that connects with the downstream end of the curing tube, whereby the heating liquid travels continually along the length of the cable as the cable advances through the heat booster and the curing tube.

4. The curing system described in claim 2 characterized by the means for heating the insulation from its outside being a coil surrounding the chamber of the heat booster, and a high frequency generator connected with the coil and that generates a frequency high enough to make the heat induced in the conductor favor the outside of the conductor that is in contact with the insulation system.

5. The curing system described in claim 2 characterized by the heat booster including a pipe that encloses the chamber of the heat booster, the pipe being made of electrical insulating material that is not heated by the high frequency field, and metal strips on the inside surface of the pipe that are heated by the high frequency field, the strips being circumferentially spaced from one another so as not to shield the conductor of the cable from the high-frequency field.

6. The curing system described in claim 5 characterized by the pipe being made of ceramic material, and the metal strips being embedded in the inside surface of the pipe and adjacent to the liquid in the clearance between the cable and the inside surface of the heat booster chamber.

7. The curing system described in claim 2 characterized by the pump being of sufficient capacity to maintain the hot liquid under super-atmospheric pressure, and the liquid having the characteristics of good thermal transfer, high operational temperature, good compatibility with cross-linked polyethylene and ethylene propylene rubber, and high molecular weight to minimize or avoid migration of the hot liquid into the insulation of the cable.

8. The curing system described in claim 7 characterized by the molecular weight of the high temperature liquid being at least 800, and a heater that heats the high temperature liquid to at least 200° C.

9. The curing system described in claim 2 characterized by the chamber of the heat booster at the end where the cable enters the heat booster being of larger diameter than the cable where the cable comes from the extruder, said larger diameter being more than the normal expansion of the insulation as a result of temperature rise so that there is clearance in the chamber around the outside of the insulation.

10. The curing system described in claim 1 characterized by a cable feeder that advances the cable at a speed coordinated with the length of the curing tube to have the curing of the cable completed before it passes out of the downstream end of the curing tube.

11. The curing system described in claim 1 characterized by a cooling tube at the downstream end of the curing tube and into which the cable passes as the cable leaves the curing tube, the cooling tube being coordinated with the speed of advance of the cable through the curing tube to have the insulation cooled and set to the point where the outside of the insulation will not deform before it reaches the end of the cooling tube.

12. The curing system described in claim 11 characterized by means for supplying cooling fluid to the cooling tube under high pressure.

13. The curing system described in claim 12 characterized by the cooling tube having an inside diameter greater than the diameter of the cable so that there is clearance within the cooling tube around the outside of the cable, and the means for supplying cooling liquid to the cooling tube including a pump adjustable to regulate the pressure of the cooling fluid.

14. The curing system described in claim 13 characterized by an adjustable relief valve for maintaining the pressure of the cooling fluid in the cooling tube at a pressure of approximately 250 pounds per square inch.

15. A curing system for the insulation on electric cables including in combination a heat booster through which an insulated cable passes, means for heating the insulation in the heat booster to a temperature at which the insulation will cure rapidly, and a curing pipe located in position to receive the cable as it comes from heat booster, means for maintaining the cable under high pressure in both the heat booster and the curing pipe, said curing pipe being longer than the heat booster, means for propelling the cable through the heat booster and curing pipe, the length of the curing pipe being long enough to complete the curing of the insulation at the temperature to which the insulation is heated in the curing pipe when advancing at the speed of the means for propelling the cable.

16. The curing system described in claim 15 characterized by the curing pipe being a metal pipe with an inside diameter larger than the diameter of the cable so as to leave a clearance between the cable insulation and the inside surface of the pipe, means for circulating a heating fluid under pressure through the clearance for curing the insulation, and an electric supply which circulates current through the metal pipe generating heat for maintaining the temperature of the fluid.

17. The curing system described in claim 16 characterized by the heater being an electric resistance element wrapped around the outside of the pipe and in contact with the metal of the pipe.

18. The curing system described in claim 15 characterized by the curing pipe having a jacket surrounding it, and means for supplying hot liquid to the jacket to maintain the temperature of the pipe and the curing fluid in the pipe.

19. The curing system described in claim 15 characterized by the diameter of the passage through the heat booster and curing pipe being only slightly larger than the diameter of the cable with which the curing system is intended to be used and to assure a minimum out-of-roundness of the cable when passing through the curing system with the passages extending horizontally, and the passage being filled with liquid which provides buoyancy for the cable so as to further reduce the out-of-roundness of the heated cable in the passage through the heat booster and the curing pipe.

20. The curing system described in claim 15 characterized by the heat booster and the curing pipe being successive sections of a composite pipe, means for circulating a curing liquid through the heat booster and the curing pipe, a circulator, pressurizer and heater system for the liquid curing medium, seals for preventing leakage of the curing liquid from the composite pipe where the cable enters and leaves said composite pipe.

21. The curing system described in claim 20 characterized by a cooling tube beyond the curing pipe and into which the cable passes from the curing pipe.

22. The curing system described in claim 21 characterized by the curing pipe having a length in excess of about 12 times the length of the heat booster.

23. The curing system described in claim 15 characterized by an ultrasonic vibration heater for heating the insulation on the cable as the cable passes through a portion of the curing system.

24. The curing system described in claim 15 characterized by the means for heating the insulation including a heater for a curing liquid, the inside diameter of the heat booster and curing pipe being larger than the cable with which the system is intended to be used, so that there is clearance around the outside of the cable for the flow of curing liquid lengthwise of the heat booster and curing pipe, the inside of the heat booster and the curing pipe being a smooth surface and increasing in inside diameter to the extent of the expansion of the cable as it becomes more highly heated in the system so as to avoid restricting the clearance around the cable by the thermal expansion of the cable.

25. A curing system for extruded insulation that surrounds a conductor of a high-voltage electric cable including in combination an extrusion die that applies to a conductor polymeric insulation that has to be cured, a curing chamber into which the cable passes beyond the extruder, said chamber having an inside diameter larger than the diameter of the extrusion die from which the insulated cable emerges, means for passing a hot liquid curing medium though clearance in said chamber between the outside of the insulation and the surrounding wall of the chamber, and a heat booster at the upstream end portion of the curing system, said heat booster comprising a pipe made of electrical insulating material which is free of any consequential amount of magnetizable material.

26. The curing system described in claim 25 characterized by a jacket around the outside of the pipe, and means for circulating hot liquid through the jacket for supplying heat that flows by conduction through the pipe to the hot liquid curing medium located within the pipe.

27. A curing system for extruded insulation that surrounds a conductor of a high-voltage cable including in combination a curing chamber into which a cable passes, said chamber being the interior of a pipe made of electrical insulating material that is capable of withstanding the high temperature required for curing the insulation, and metal strips for conducting heat through part of the wall of the pipe, said metal strips being embedded in said electrical insulating material of which the pipe is made.

28. The curing system described in claim 27 characterized by the metal strips being embedded in the mass of the electrical insulating material of the pipe.

29. The curing system described in claim 27 characterized by the metal strips being embedded in the outside surface of the electrical insulating pipe.

* * * * *

UNITED STATES PATENT OFFICE
CERTIFICATE OF CORRECTION

Patent No. 4,080,131      Dated March 21, 1978

Inventor(s) GEORGE BAHDER, CARLOS KATZ & LOUIS A. BOPP

It is certified that error appears in the above-identified patent and that said Letters Patent are hereby corrected as shown below:

The address of the assignee is Greenwich, Connecticut

Signed and Sealed this

Fifteenth Day of August 1978

[SEAL]

Attest:

RUTH C. MASON
Attesting Officer

DONALD W. BANNER
Commissioner of Patents and Trademarks